United States Patent
Ashcraft et al.

(10) Patent No.: US 8,284,506 B2
(45) Date of Patent: Oct. 9, 2012

(54) APPARATUS AND METHOD FOR MAKING AND ASSEMBLING A MULTI-LENS OPTICAL DEVICE

(75) Inventors: Todd W. Ashcraft, Aurora, IL (US); Robert B. Atac, Batavia, IL (US); James Risboskin, Jermyn, PA (US); Timothy G. Allard, Dalton, PA (US); Joseph J. Fontanella, Jessup, PA (US); Mark J. Tremback, Mayfield, PA (US)

(73) Assignee: Gentex Corporation, Carbondale, PA (US)

( * ) Notice: Subject to any disclaimer, the term of this patent is extended or adjusted under 35 U.S.C. 154(b) by 963 days.

(21) Appl. No.: 12/255,262

(22) Filed: Oct. 21, 2008

(65) Prior Publication Data
US 2011/0310497 A1 Dec. 22, 2011

(51) Int. Cl.
G02B 7/02 (2006.01)
(52) U.S. Cl. ......................................................... 359/819
(58) Field of Classification Search .................... 359/819
See application file for complete search history.

(56) References Cited

U.S. PATENT DOCUMENTS

| | | | |
|---|---|---|---|
| 4,258,982 A | 3/1981 | Skinner et al. | |
| 4,968,123 A | 11/1990 | Fournier et al. | |
| 5,189,512 A | 2/1993 | Cameron et al. | |
| 5,257,094 A | 10/1993 | LaRussa | |
| 5,310,623 A | 5/1994 | Gal | |
| 5,416,876 A | 5/1995 | Ansley et al. | |
| 5,488,508 A | 1/1996 | Haseltine | |
| 5,539,422 A | 7/1996 | Heacock et al. | |
| 5,619,373 A | 4/1997 | Meyerhofer et al. | |
| 5,625,372 A | 4/1997 | Hildebrand et al. | |
| 5,748,390 A | 5/1998 | Koiwai et al. | |
| 5,835,279 A | 11/1998 | Marshall et al. | |
| 6,215,604 B1 | 4/2001 | Hori | |
| 6,359,602 B1 | 3/2002 | Amafuji et al. | |
| 6,407,724 B2 | 6/2002 | Waldern et al. | |
| 6,445,362 B1 | 9/2002 | Tegreene | |
| 6,456,261 B1 | 9/2002 | Zhang | |
| 6,560,029 B1 | 5/2003 | Dobbie et al. | |
| 6,731,434 B1 | 5/2004 | Hua et al. | |
| 6,741,394 B1 | 5/2004 | Tanitsu et al. | |
| 6,771,423 B2 | 8/2004 | Geist | |
| 6,774,984 B2 | 8/2004 | Gerhard | |
| 6,972,735 B2 | 12/2005 | Hebert | |
| 7,016,121 B2 | 3/2006 | Kawanabe et al. | |
| 7,145,726 B2 | 12/2006 | Geist | |
| 2002/0126392 A1 | 9/2002 | Dubinovsky et al. | |
| 2004/0008157 A1 | 1/2004 | Brubaker et al. | |
| 2005/0063073 A1 | 3/2005 | Glassburn et al. | |
| 2006/0028400 A1 | 2/2006 | Lapstun et al. | |
| 2006/0109668 A1 | 5/2006 | Schmieder et al. | |
| 2006/0119951 A1 | 6/2006 | McGuire | |
| 2006/0181483 A1 | 8/2006 | Ari | |
| 2006/0209434 A1 * | 9/2006 | Baik et al. ..................... 359/819 |
| 2007/0177275 A1 | 8/2007 | McGuire | |

FOREIGN PATENT DOCUMENTS

| | | |
|---|---|---|
| EP | 1326118 | 9/2003 |
| JP | 2006201690 | 1/2005 |
| WO | 2007093983 | 8/2007 |

* cited by examiner

*Primary Examiner* — James Jones

(74) *Attorney, Agent, or Firm* — Morgan, Lewis & Bockius LLP

(57) ABSTRACT

A system for aligning a plurality of high-precision lenses in a lens train. Each of the lenses has at least two alignment tabs disposed around the perimeter of the lens. The lenses are aligned by placing the lenses in a jig having a plurality of high-precision alignment blocks. The lenses are attached to a lower-precision shroud, having slots that receive the alignment tabs. A gap-filling adhesive is used to provide a high-precision fit for the lenses in the shroud.

22 Claims, 9 Drawing Sheets

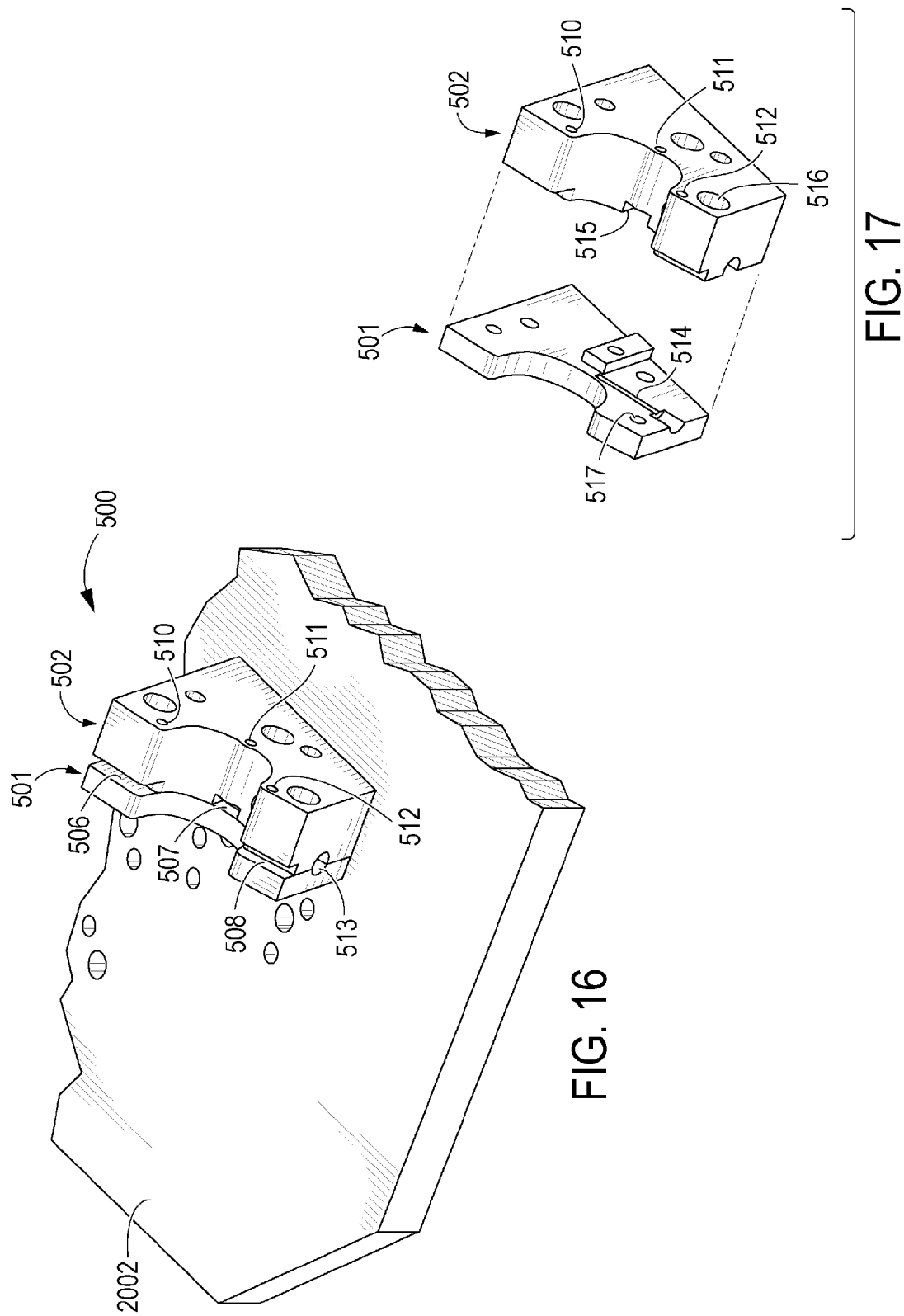

APPARATUS AND METHOD FOR MAKING AND ASSEMBLING A MULTI-LENS OPTICAL DEVICE

STATEMENT OF GOVERNMENT INTEREST

The U.S. Government has a paid-up license in this invention and the right in limited circumstances to require the patent owner to license others on reasonable terms as provided for by the terms of Contract Number N00421-04-D-0010 awarded by the Naval Air Warfare Center AD (PAX).

BACKGROUND OF THE INVENTION

The present principles generally relate to optical systems, and more particularly, to a system and method for alignment of optical elements in relation to each other in an optical device using references on the optical elements.

Within the art of optical device design, multiple optical lenses are commonly used together in a variety of optical devices. Multiple lenses (often referred to as a "lens train") are commonly used in optical devices such as cameras, telephoto lenses, binoculars, telescopes, microscopes, night vision scopes, vehicular and marine periscopes, and the like.

When fabricating optical devices with multiple lenses, the alignment of each individual lens relative to the other lenses in the lens train is critical to achieving the desired optical performance. FIG. 1a illustrates a pair of lenses 108, 110 in a lens train 100, in which the lenses 108, 110 are properly aligned with each other. A viewed object 102 falls within the confines of a field of view 104. Light reflecting off of the viewed object 102 passed through the first lens 108 and is magnified to create an intermediate image (not shown). The intermediate image is then focused onto a second lens 110 which performs additional magnification or other optical modification of the intermediate image, resulting in a final displayed image 112. When properly aligned, the first lens 108 focuses an image of the object 102 onto the second lens 110 in a predictable and acceptable manner. Centerline 106 illustrates a path that may be ideal for referencing alignment of the first lens 108 and the second lens 110. In contrast, FIG. 1b illustrates the lens train 100 with the first lens 114 misaligned with respect to the second lens 110. Accordingly, misaligned first lens 114 does not properly focus an intermediate image onto the second lens 110, resulting in an off-center and/or distorted displayed image 116.

The current state of the art teaches methods for aligning lenses with respect to other elements of an optical device using precision housings and the like. In particular, with the rise of inexpensive digital cameras, many manufacturers have attempted to align camera lenses with optical sensors by providing a precision alignment surface within the housing of the camera. Precision alignment of lenses in the current state of the art requires the lens housing to be manufactured to high tolerances in order to provide a high tolerance fit between the housing and the lenses. The necessity of providing precision lens housings results in an increased manufacturing cost.

SUMMARY OF THE INVENTION

In one respect, the invention comprises an optical device comprising a lens train including a plurality of lenses, each of the plurality of lenses having a lens body and at least two lens tabs extending outwardly from the lens body; and a housing having a plurality of lens tab slots, each of the plurality of lens tab slots being configured so that the one of the plurality of lens tabs extends through the lens tab slot when the housing and plurality of lenses are fully assembled.

In another respect, the invention comprises an apparatus comprising a lens train including a plurality of lenses and a housing in which the plurality of lenses are contained, each of the plurality of lenses having a lens body and at least two lens tabs extending outwardly from the lens body, the shape and orientation of each of the at least two tabs on each of the plurality of lenses being different than the shape and/or orientation of each of the at least two tabs on each of the other lenses of the of the plurality of lenses.

In yet another respect, the invention comprises a method for aligning a plurality of lenses in a lens train to form an optical device, the method comprising positioning each of the plurality of lenses on an alignment jig at a first tolerance that is no less than a predetermined alignment tolerance; affixing each of the plurality of lenses to a housing at a second tolerance that is no less than the alignment tolerance, the housing being manufactured to a tolerance that is larger than the alignment tolerance; removing the plurality of lenses and the housing from the alignment jig; and maintaining the relative position of each of the plurality of lenses within a third tolerance that is no less than the predetermined alignment tolerance after the plurality of lenses and the housing are removed from the alignment jig.

In yet another respect, the invention comprises a method comprising positioning a first lens in a first alignment block; affixing the first lens to a housing while the lens is positioned in the first alignment block; and after the affixing step, removing the first lens from the first alignment block with the housing attached.

In yet another respect, the invention comprises a method of designing and making a first lens for use as part of an optical device having a plurality of lenses, the first lens including a lens body having at least two optical surfaces and a perimeter edge located between the at least two optical surfaces, the method comprising: forming at least two optical surfaces of the lens body and a perimeter edge having a first perimeter shape, the first perimeter shape being a simple closed curve; identifying a first portion of the lens body through which light generated by the optical device could potentially pass when the optical device is operated and a second portion of the lens through which light generated by the optical device will not pass when the optical device is operated; after the forming step, removing at least part of the second portion of the lens body, the removing step resulting in the perimeter edge having a second perimeter shape that is a complex closed curve.

BRIEF DESCRIPTION OF THE DRAWINGS

The present invention will hereinafter be described in conjunction with the appended drawing figures, wherein like numerals denote like elements. It should be understood that the drawings are for purposes of illustrating the concepts of the present invention and are not necessarily the only possible configuration for illustrating the present invention.

FIG. 16 is a perspective view of a second embodiment of an alignment block positioned on a partial view of an alignment jig; and FIG. 17 is an exploded view of the alignment block shown in FIG. 16.

DETAILED DESCRIPTION OF THE INVENTION

Figure 1A:
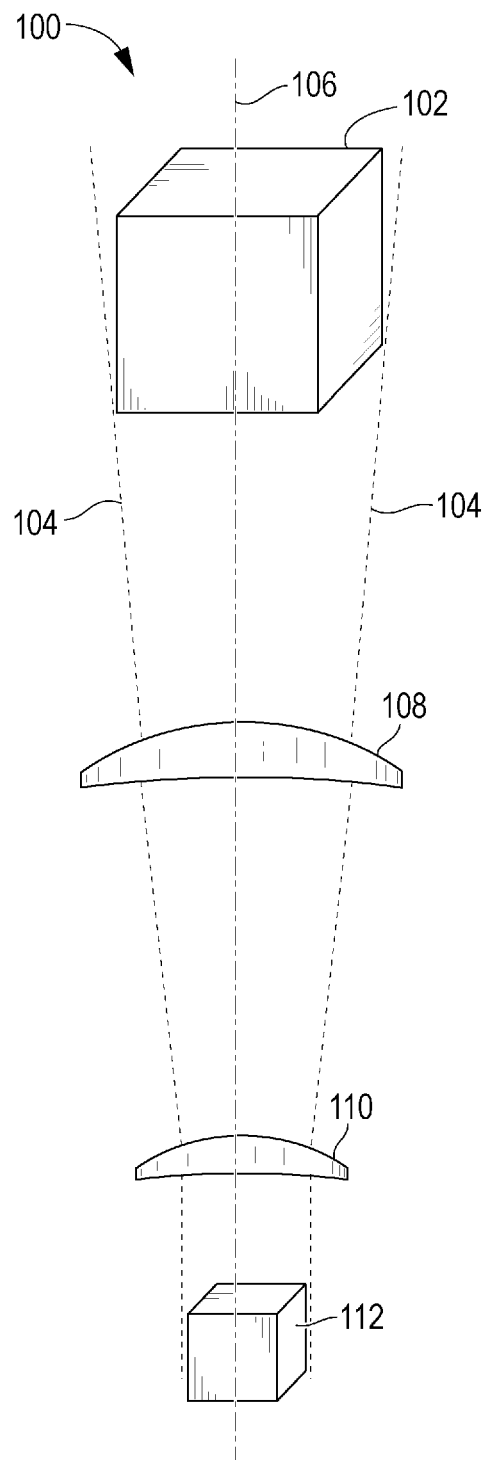
FIG. 1a is a diagram illustrating an aligned lens train according to the prior art.
Figure 1B:
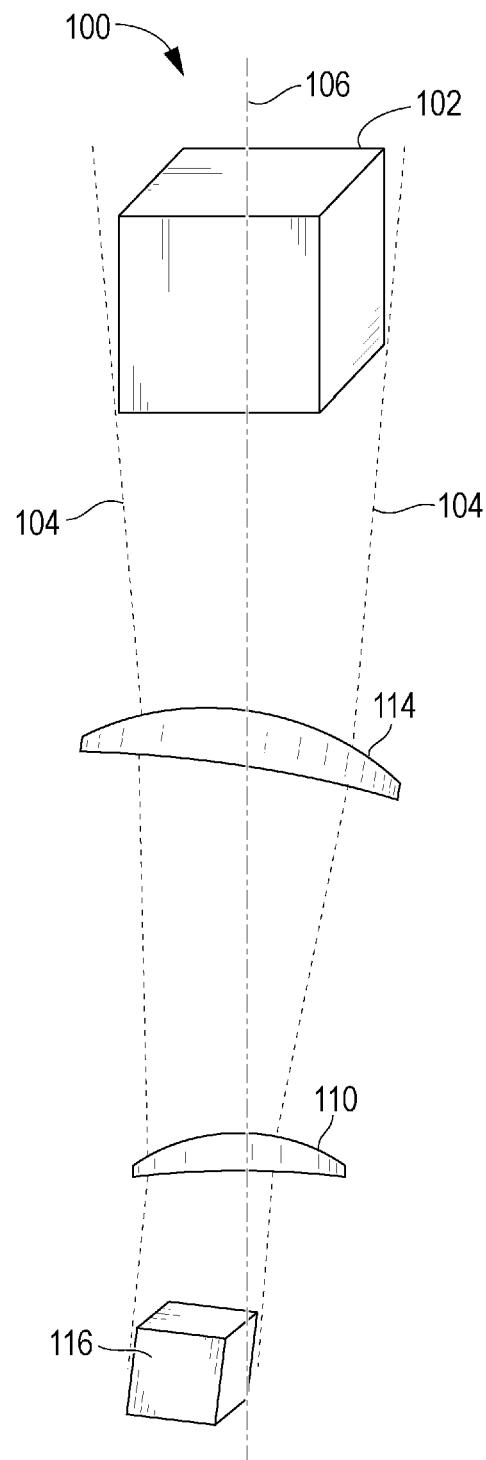
FIG. 1b is a diagram illustrating a misaligned lens train according to the prior art.
Figure 2:
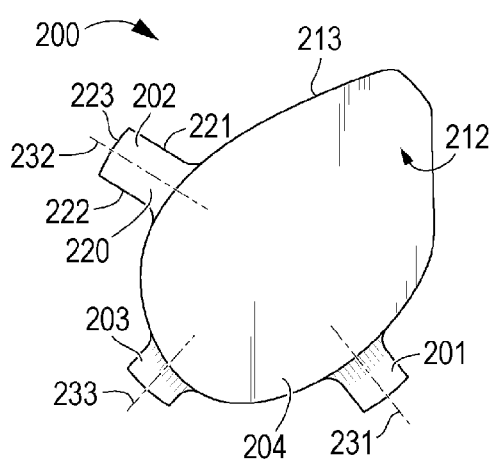
FIG. 2 is a diagram illustrating a front view of one embodiment of a lens having alignment tabs.
Figure 3:
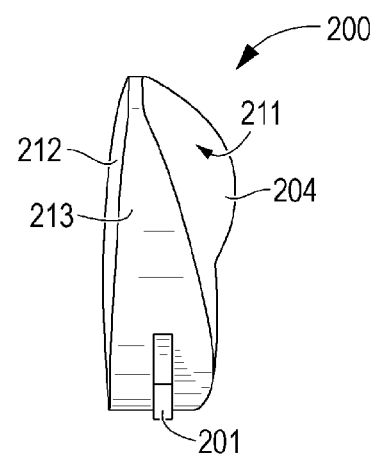
FIG. 3 is a right side view of the lens shown in FIG. 2.
Figure 4:
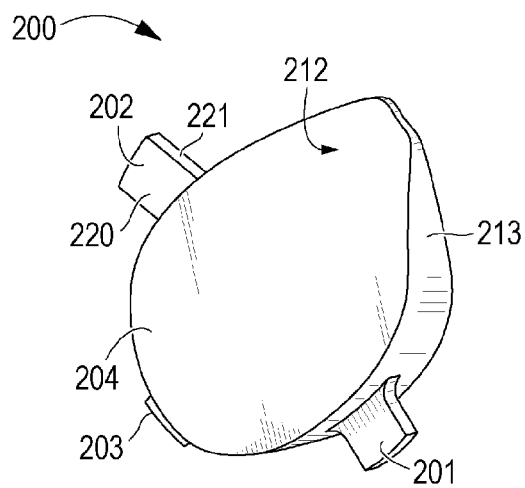
FIG. 4 is a front perspective view of the lens shown in FIG. 2.
Figure 5:
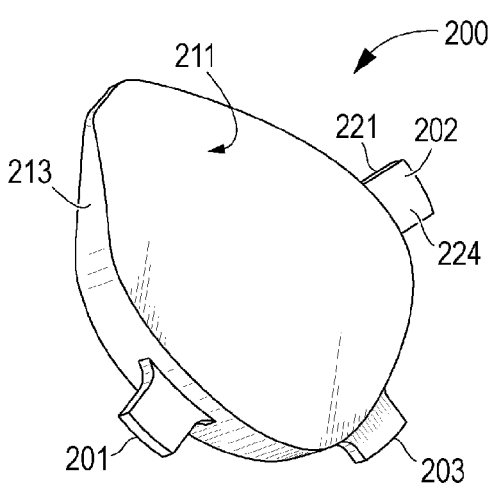
FIG. 5 is a rear perspective view of the lens shown in FIG. 2.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

The present principles are directed to a system and method for alignment of a series of lenses, called a lens train or an optical train. In particular, a lens train may be used to precisely set the magnification and other advantageous properties of an optical device. It is to be understood that the present principles are described in terms of a system for aligning optical lenses; however, the present principles are much broader and could potentially be used with other types of optical devices.

All examples and conditional language recited herein are intended to aid the reader in understanding the present principles and the concepts contributed by the inventor to furthering the art, and are to be construed as being without limitation to such specifically recited examples and conditions. Moreover, all statements herein reciting principles, aspects, and embodiments of the present principles, as well as specific examples thereof, are intended to encompass both structural and functional equivalents thereof. Additionally, such equivalents may include both currently known equivalents as well as equivalents as yet undeveloped, including any elements developed in the future that perform the same function, regardless of structure.

Any reference to a lens, module, step or apparatus is intended to include both singular references and plural references, e.g., wherein a reference to a lens may include multiple lenses mounted in a lens carrier or holder, or multiple lenses molded together into a single assembly or piece.

In the context of engineering tolerances in this application, a first tolerance that is referred to as being "larger" than a second tolerance is intended to mean that the first tolerance is "looser" or less precise that the second tolerance. For example, a tolerance of ±1.0 cm would be larger than a tolerance of ±0.1 cm.

Referring now to FIGS. 2 through 5, one embodiment of a lens 200 having a lens body 204 and three alignment tabs 201, 202, 203 is depicted. The lens 200 is preferably a unitary structure, precision-machined from a single piece of material. The lens 200 is preferably made from an optical-grade polymer, such as a cyclic olefin copolymer, for example. Alternatively, any material which is machineable to optical smoothness could be used.

As will be described in greater detail herein, one or more of the tabs 201, 202, 203 is used to properly align the lens 200, first in an alignment block and then in a shroud. The features and structure of the alignment block and shroud will be described herein.

In this embodiment, each tab 201, 202 and 203 extends outwardly from the lens body 204 and includes two faces and three edges. In the interest of simplicity, the faces and edges of tab 202 will be described in detail and it should be understood that tabs 201 and 203 have similarly-oriented faces and edges. Tab 202 includes opposing front and rear faces 220, 224, opposing side edges 221, 222 and an end edge 223. The front and rear faces 220, 224, and side edges 221, 222 and end edge 223 are all preferably flat. As will be described in greater detail herein, any of the front and rear faces 220, 224, side edges 221, 222 and end edge 223 may be used as a "control surface," which is used to precision-align the lens 200 during an assembly process. Each of the tabs 201, 202, 203 has a central axis 231, 232, 233, which bisects the width of each tab 201, 202, 203. For the purposes of this embodiment, the width dimension of each tab 201, 202, 203 is distance between the side edges.

In most embodiments, it is desirable to minimize the number of tab faces and edges that must engage bearing surfaces of the alignment blocks in order to properly align the lens 200 in an alignment block. Proper alignment of the lens 200 requires precision control of each of the six degrees of freedom, which comprise rotation and displacement relative to the X-, Y- and Z-axes. Accordingly, in this embodiment, none of the central axes 231, 232, 233 of the tabs 201, 202, 203 are perpendicular to each other.

The lens body 204 (also referred to as the optical field) is the primary active optical region of the lens 200. The lens body 204 comprises a front face 212, a rear face 211 and a perimeter edge 213 that spans from the front face 212 to the rear face 211. The perimeter edge 213 will comprise a surface in areas in which the front and rear faces 212, 211 do not meet. The shape and contours of the front and rear faces 212, 211 are dictated by the desired optical properties of the lens 200.

Notably, the perimeter edge 213 is irregular in shape in this embodiment. This stands in contrast to most conventional optical lenses, which are manufactured with a relatively simple, regular perimeter shape (e.g., a circular, oval or elliptical shape). The irregular shape of the perimeter edge 213 is the result of additional lens material being removed in areas of the lens body 204 through which light is not intended to pass when the lens train is operated.

In order to determine where light will pass when the lens train is operated, the lens train is computer-modeled, using an optics design package, such as Zemax® or CodeV® optical design software. As part of the modeling process, the path of light through the lens body 204 is determined. The lens train could be optimized to, among other variables, provide a low mass and maximum field of view.

Figure 6:
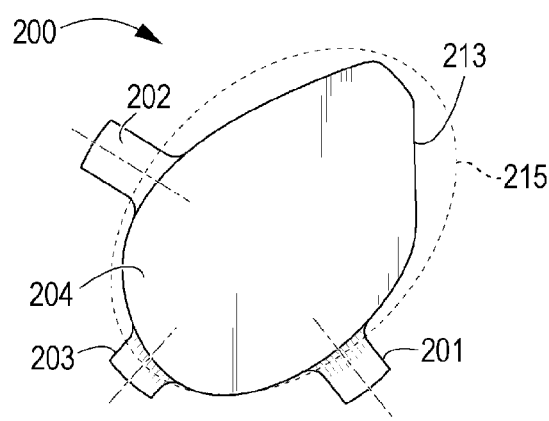
FIG. 6 is a front view of the lens shown in FIG. 2, including a dashed line showing a possible "rough-cut" perimeter shape.
Figure 7:
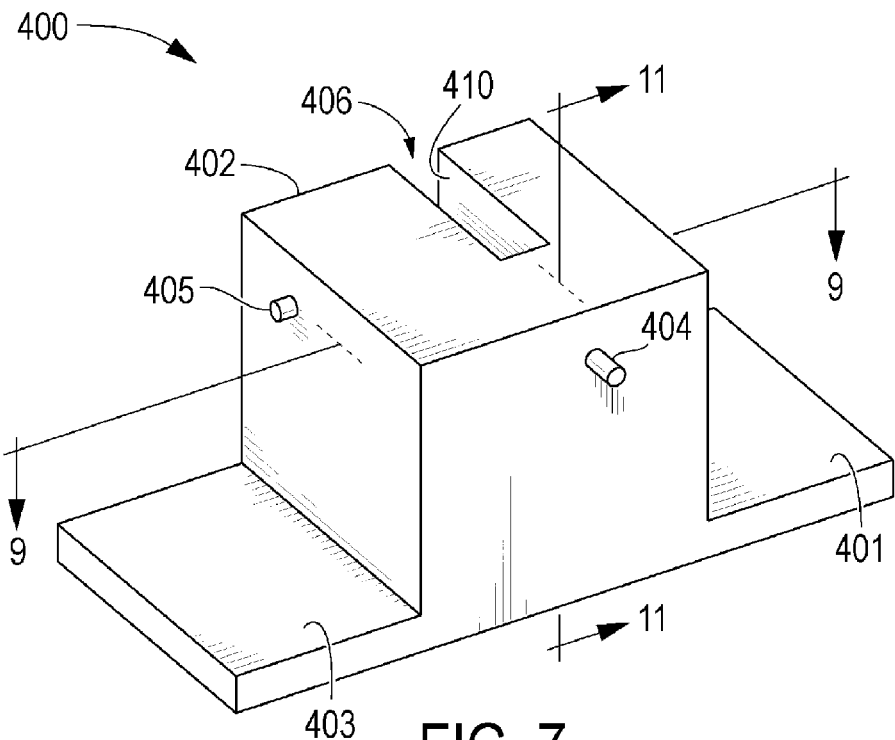
FIG. 7 is rear perspective view of one embodiment of a alignment block.
Figure 8:
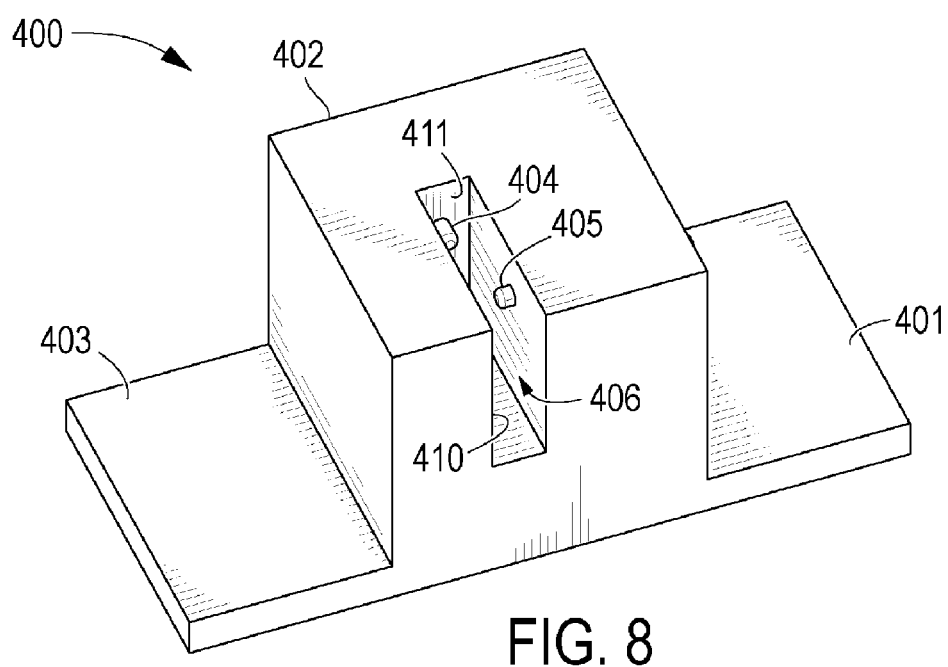
FIG. 8 is a front perspective view of the alignment block shown in FIG. 7.
Figure 9:
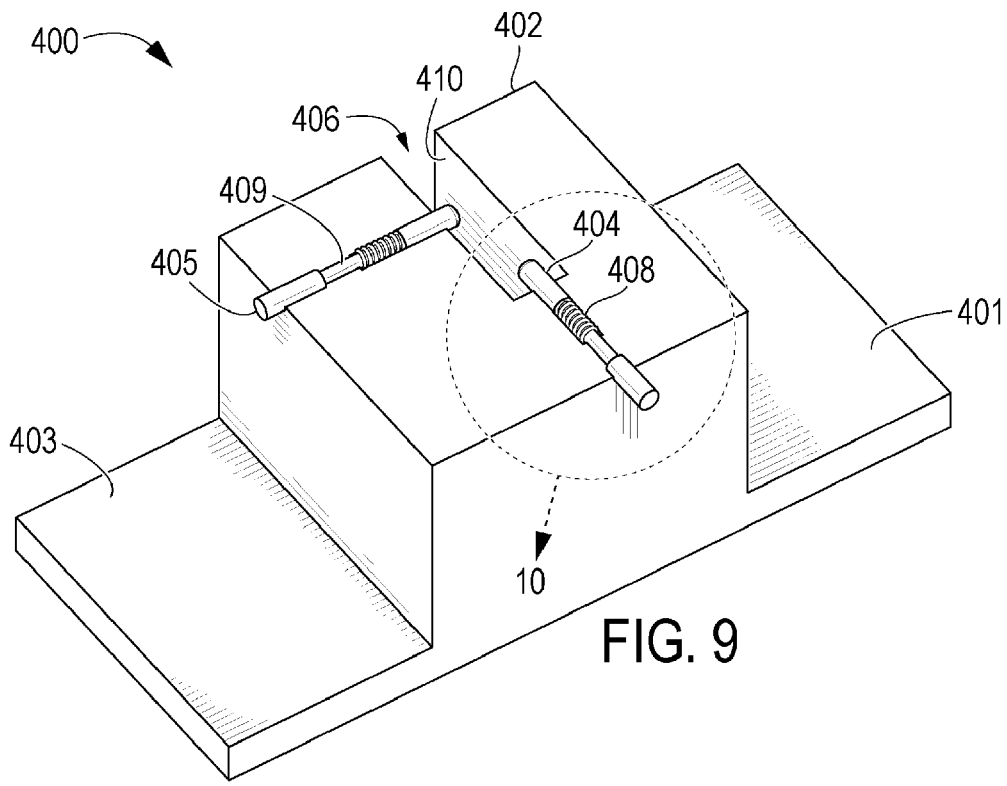
FIG. 9 is a sectional view taken along line 9-9 of FIG. 7.

Referring now to FIG. 6, the lens 200 is preferably manufactured in multiple stages. First the lens body 204 is preferably "rough-shaped" to a perimeter shape 215 preferably comprising a simple, closed curve, such as a circle or an ellipse. The front and rear faces 212, 211 are then cut to specification, which, in some applications, can include highly complex contours. After the front and rear faces 212, 211 are cut, portions of the lens body 204 through which light will not pass (as determined by the modeling process) are cut away, often leaving an irregular, complex perimeter shape (see perimeter edge 213). Lens tabs 201, 202, 203 are cut during the machining of the perimeter edge 213. Cutting away unneeded lens material enables the lens train to be smaller and lighter, which is desirable in many applications, including mobile devices and helmet mounted display systems, for example.

The lens manufacturing steps set forth in the previous paragraph could be carried out using a number of different manufacturing methods. For example, the "rough shaping" of the lens 200 could be performed by an injection molding process and the cutting away of the portions of the lens body 204 through which light will not pass could be performed using a precision machining process. Optionally, the front and rear faces 212, 211 could also be "rough-shaped" by the molding process, then precision machined. In addition, the lens body could be injection molded into a circular shape, then rough cut to an elliptical shape, then cut to the final, irregular perimeter shape. Preferably, final machining is performed using an ultra-precision diamond machining system.

Figure 10:
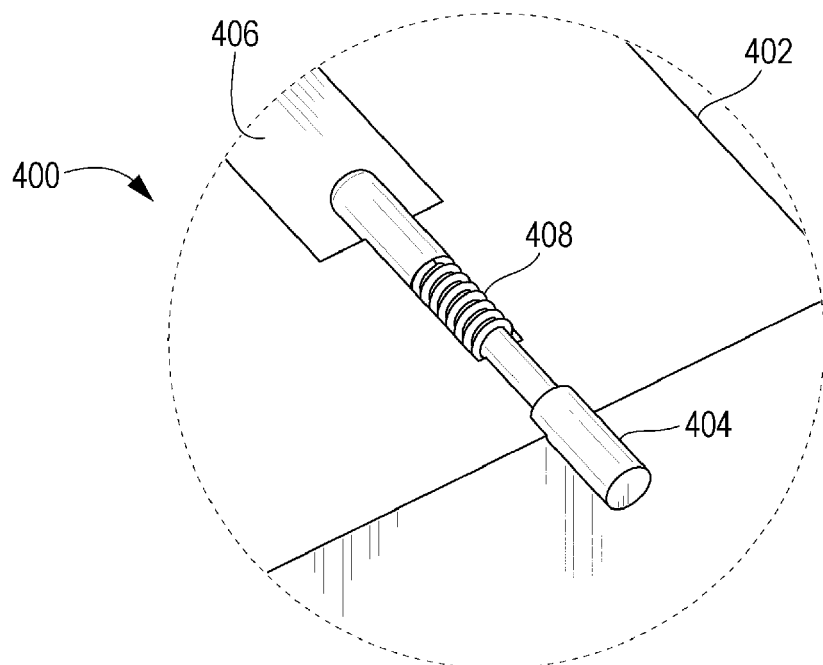
FIG. 10 is an enlarged partial view of area 10-10 of FIG. 9.

FIGS. 7 through 10 show an alignment block 400 which, as will be described in greater detail herein, is used to precision-position a lens (such as lens 200) during assembly of a lens train. The alignment block 400 has a body 402 with an alignment slot 406 which is sized to receive a lens tab (such as tab 202 of lens 200). In order to aid in mounting the alignment block 400 and to provide a more stable mounting surface, the alignment block may have flanges 401, 403 which extend laterally from the lower end of the body 402. The alignment block 400 also includes one or more pins or plungers 404, 405 for urging and holding an inserted lens tab against one or more of the surfaces of the slot 406. The plungers 404, 405 may be spring loaded (as shown in FIG. 10), threaded, or otherwise configured to force a lens tab into position against one or more of the interior surfaces of the slot 406. In alternate embodiments, other types of retaining devices, such as set screws, for example, could be used instead of plungers 404, 405.

Figure 11:
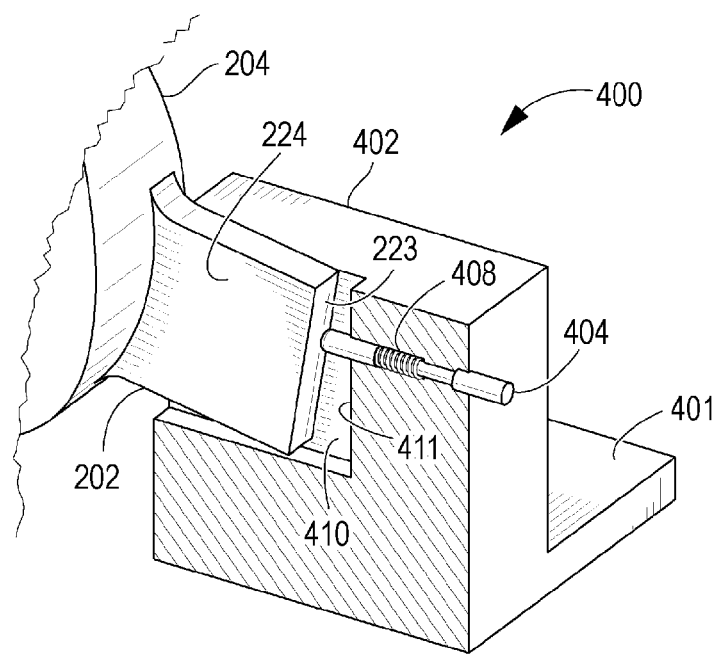
FIG. 11 is a sectional view taken along line 11-11 of FIG. 7, shown with a lens tab inserted in the alignment slot.
Figure 12:
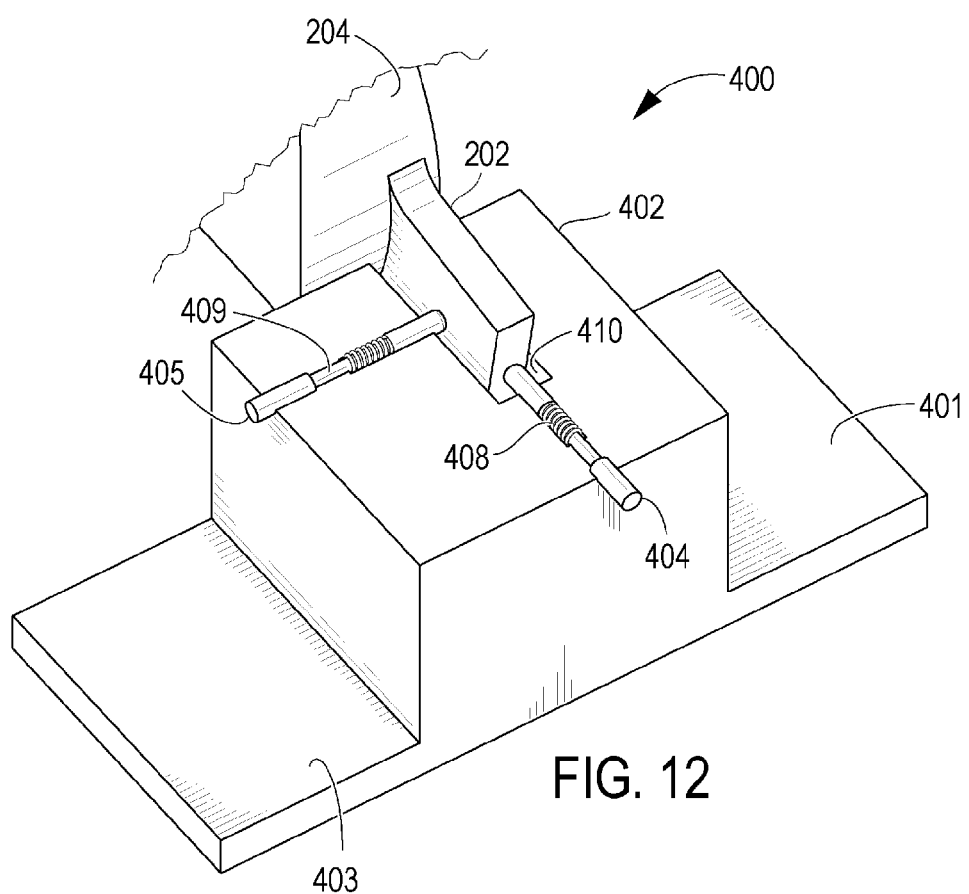
FIG. 12 is a sectional view taken along line 9-9 of FIG. 7, shown with a lens tab inserted in the alignment slot.

In this embodiment, the plunger 404 is positioned transverse to plunger 405 and both are positioned at approximately the same vertical position. Accordingly, referring to FIGS. 11 and 12, plungers 404, 405 may be used to press (urge) a face of a lens tab (for example, the face 220 of tab 202) against a bearing surface 410 and position the end edge of the tab (for example, end edge 223 of tab 202) a desired distance from surface 411. In other embodiments, variations in the number and/or position of the plungers 404, 405 are possible, depending upon the desired positioning characteristics of the lens that is to be positioned by the block 400. In addition, a different surface could be used as the bearing surface (i.e., the surface against which the lens tab is pressed) and/or more than one surface of the alignment slot 406 could be used as a bearing surface. It is, however, important that each pair of alignment blocks engage the tabs of the lens retained by that pair of alignment blocks in a manner that secures the lens in the proper position with respect to all six degrees of freedom.

Figure 13:
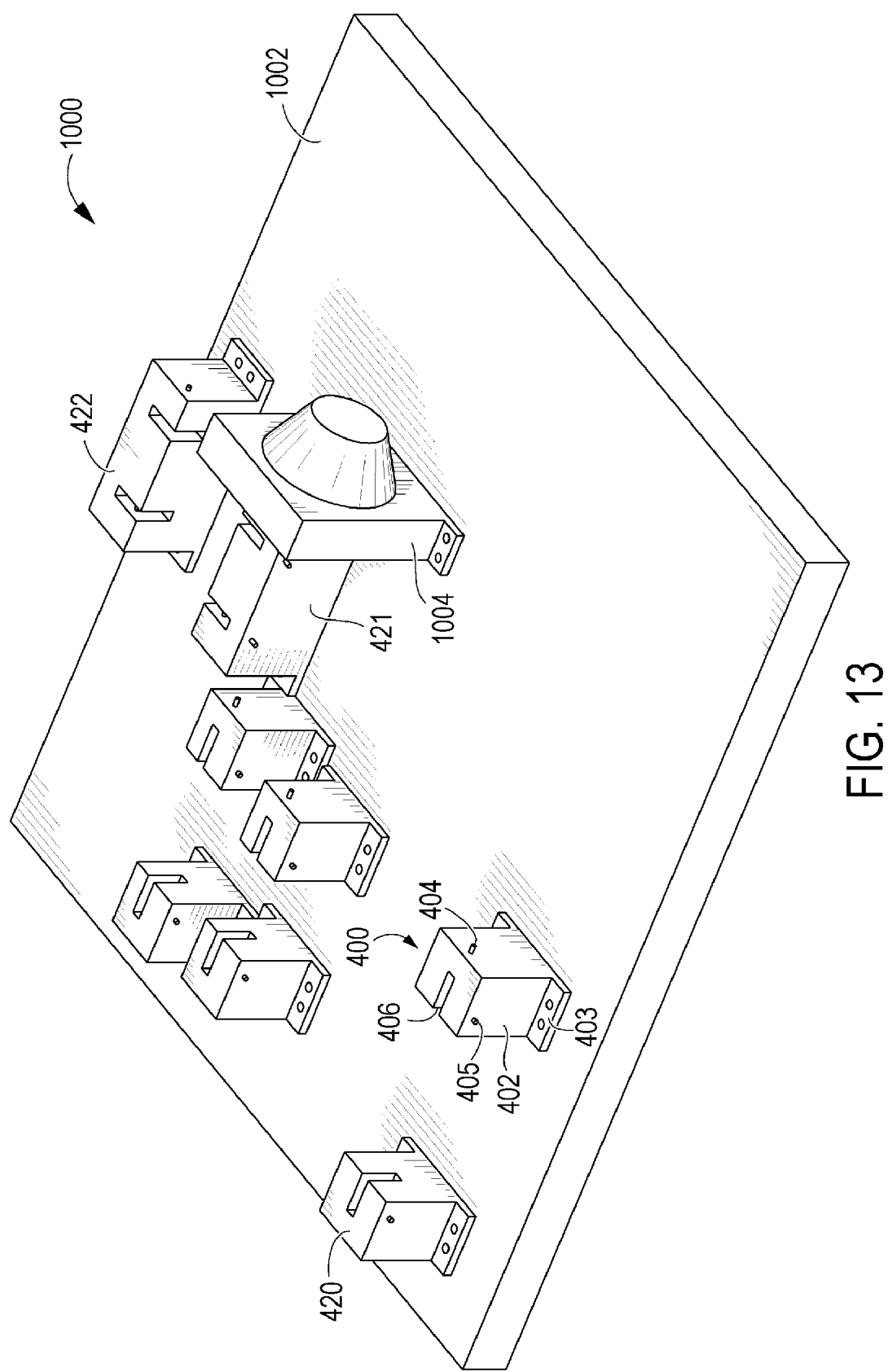
FIG. 13 is a perspective view showing an alignment jig.

Referring to FIG. 13, a plurality of pairs of lens alignment blocks (for example, blocks 400, 420) are shown arranged on a base 1002. The blocks and base 1002 collectively define an alignment jig 1000. Each alignment block is preferably rigidly affixed to the base 1002. Any suitable means could be used to affix the alignment blocks to the base 1002. For example, the alignment block flanges (such as flanges 401, 403) could be bolted, welded, bonded, or screwed, to the base 1002.

Various lens alignment block configurations may be used on the alignment jig 1000 in order to accommodate the size, configuration and/or spacing of the elements in the lens train to be aligned. For example, a pair of alignment blocks 421, 422, each having two slots, are used in jig 1000 because of close spacing of two lenses 250, 251 (see FIG. 14). Skilled artisans will recognize that, while single and double slotted alignment blocks have been illustrated, any number of slots may be employed on a single alignment block.

Alignment blocks may also be provided to align elements of the lens train other than lenses. For example, alignment block 1004 is used to align an image source assembly 1005 (see FIG. 14).

Figure 14:
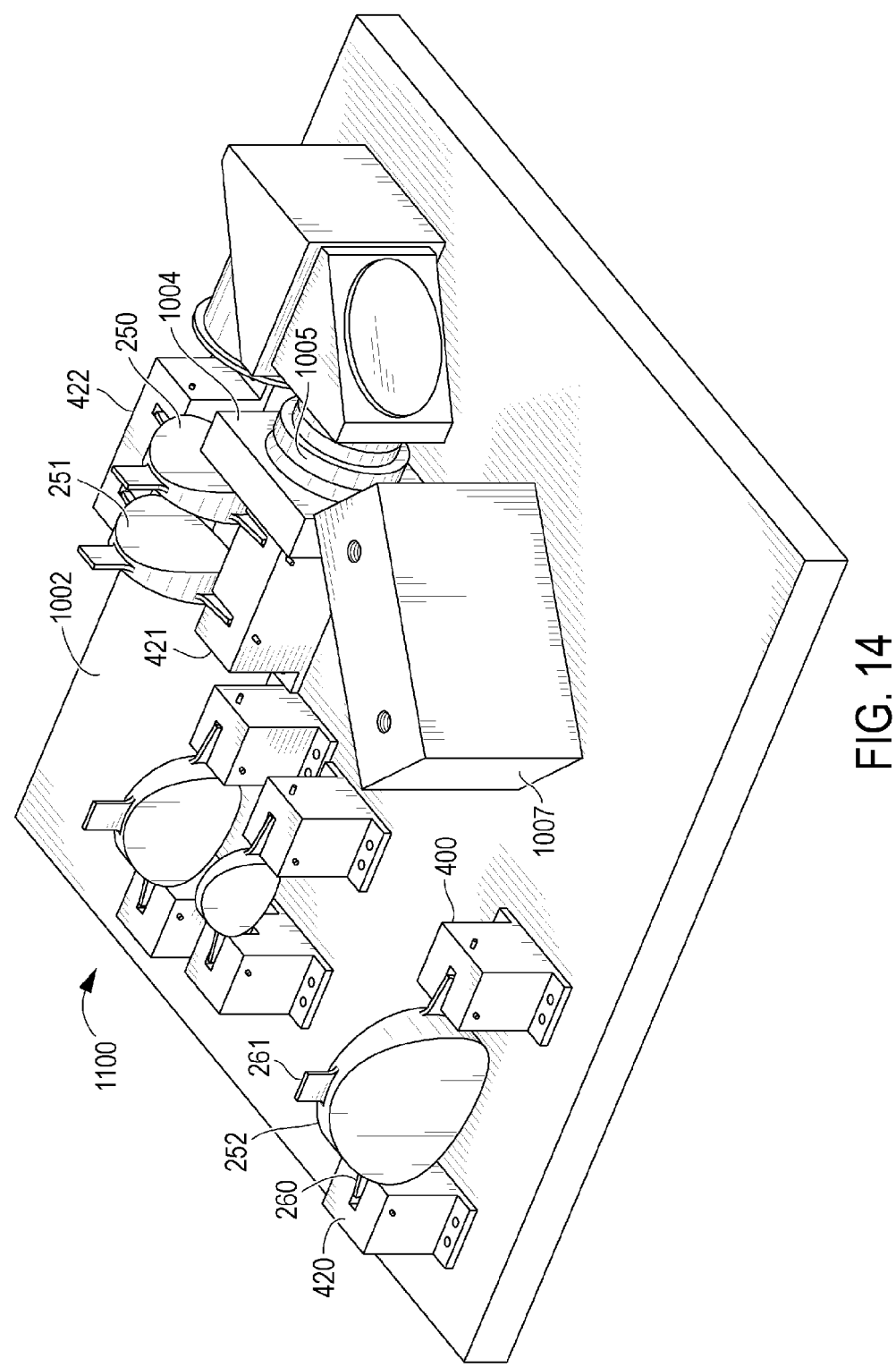
FIG. 14 shows the same view as FIG. 13, with several lenses and an image source assembly positioned on the alignment jig.
Figure 15:
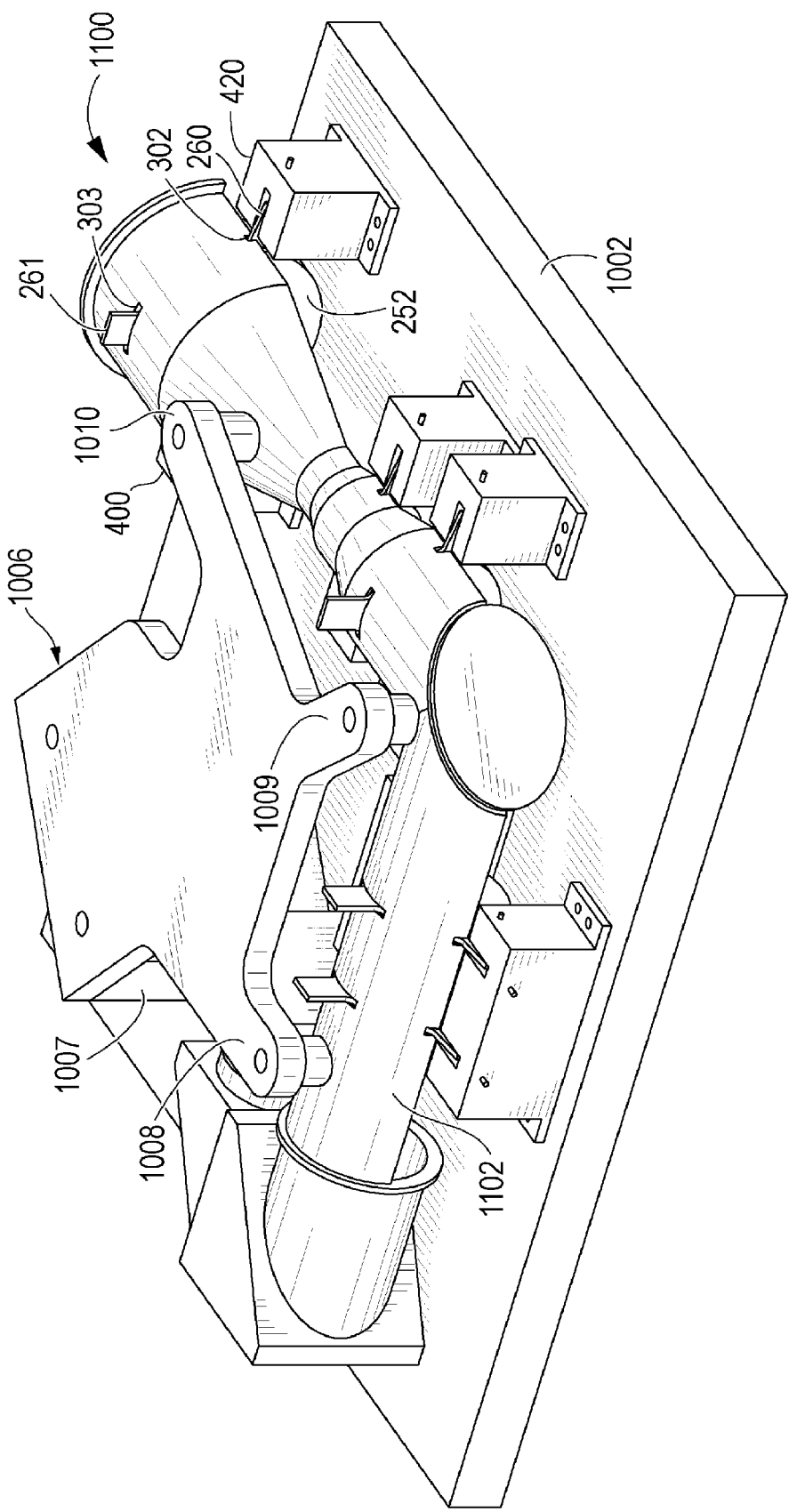
FIG. 15 shows the same view as FIG. 14, with an upper portion of the housing positioned on the alignment jig.

FIGS. 14 and 15 illustrate the assembly of an optical device 1100 according to the principles of the present invention. Referring to FIG. 14, a series of lenses, each having tabs formed thereon are positioned on alignment blocks. The process used to align each lens (lens 252, for example) in its respective set of alignment blocks (alignment blocks 400, 420, for example) is as described above in connection with FIGS. 7-10.

In addition to dimensional tolerances, each optical component that forms part of the optical device 1100 will have a set of "alignment tolerances," which determine the amount of allowable error in the relative position of each of the optical components. Each set of alignment tolerances may include translational alignment tolerances (i.e., allowable translational variation in the X, Y or Z axis) and rotational alignment tolerances (i.e., allowable rotational variation about the X, Y or Z axis). For example, the set of alignment tolerances for lens 252 define the maximum allowable variation from design specifications in position of the lens in each of the six degrees of freedom. In this context, the "position" of lens 252 means its position relative to the other optical components of the device 1100. The values for the set of alignment tolerances may vary among the optical components of a single optical device. Alternatively, a single set of alignment tolerances may be applied to all of the optical components, with the tolerances being high enough to provide the desired optical performance of the device.

As discussed above, additional optical elements may be mounted in the jig 1000, and attached to the shroud. For example, FIG. 14 shows an image source 1005 mounted on alignment block 1004. Additionally, the base 1002 of the jig 1000 may be recessed, or otherwise contoured, to accept standard or frequently used elements.

It should be noted that the manner in which jig 1000 is used represents a departure from the prior art, in which adjustable alignment jigs and standard or consistent lens registrations are used. In the present invention, a standard/consistent alignment block geometry is used and each lens in the optical train is custom-cut to provide tab geometry that will enable the lens to be properly positioned.

In this embodiment, the alignment tolerances of the lenses used in optical device 1100 are preferably on the order of ±0.005 millimeters for translation in the X, Y and Z axes and ±0.01 degrees for rotation in the X, Y and Z axes. The dimensional tolerances for the shroud are preferably on the order of ±0.13 millimeters.

Referring to FIG. 15, an upper portion 1102 of a shroud is properly aligned and positioned atop the lenses using a finger plate 1006, which is secured to a finger plate block 1007, using screws, bolts or any other suitable fastener). The finger plate 1006 includes three fingers 1008, 1009, 1010 which are attached to the upper portion 1102 of the shroud with screws or bolts (not visible in FIG. 15) which extend through threaded holes (also not visible in FIG. 15) in the upper portion 1102 of the shroud. The upper portion 1102 of the shroud includes tab clearance slots. Some of the slots (such as slot 302) mate and cooperate with a corresponding slot in a lower portion of the shroud (not shown) to encircle a tab (e.g., tab 260). Other slots in the upper portion 1102, such as slot 303, completely encircle the tab (e.g., tab 261) that extends through the slot.

As stated above, the use of a larger tolerance manufacturing method for the shroud allows for a lower cost of manufacturing, as the shroud itself is generally not critical to the operation of the lens train. It should be understood that the relationship of the lenses to each other, and to any additional optical elements is critical to proper lens train alignment. The shroud acts as a frame by which the lenses are maintained in alignment. In order to maintain precision alignment of the lenses after the lenses and upper portion 1102 of the shroud are removed from the jig 1000, any gaps between each of the clearance slots of the upper portion 1102 of the shroud and the tab that extends through each respective clearance slot are filled with a liquid adhesive prior to removal from the jig 1000.

A thick, gap-filing cyanoacrylate glue is an example of a suitable liquid adhesive. There are a number of properties that are desirable in a preferred adhesive for this application, including (but not limited to): a short cure time, water-resistance, post-curing expansion or shrinkage that is within the alignment tolerances for the optical components, a coefficient of thermal expansion that is within the alignment tolerances for the expected operating temperature range for the optical device.

When the liquid adhesive has hardened sufficiently to prevent movement of the lenses, the finger plate 1006 is removed from the finger plate block 1007 with the upper shroud 1102 and affixed lenses attached. Use of the liquid adhesive enables the position of each of the lenses relative to the shroud to be maintained within its respective set of alignment tolerances after being removed from the alignment blocks.

The lower portion of the shroud (not shown) is then secured to the upper portion 1102 and affixed lenses using any suitable method. For example, the finger plate 1106 could be flipped over and placed on a flat surface. Then the lower portion of the shroud could be positioned atop the upper portion 1102 and secured thereto using an adhesive. The lower portion of the shroud provides some additional structural stability and cooperates with the upper portion 1102 of the shroud to encase the lenses and protect them from dust, moisture and other material that could be detrimental to the optical performance of the lenses.

The lens alignment and assembly method of the present invention simplifies shroud installation and reduces shroud manufacturing costs, because the lens tab alignment slots formed in the shroud can be manufactured to a larger tolerance than the dimensional or alignment tolerances of the lenses.

As a practical matter, in order to protect the lenses from dust, condensation and other material that could impair the optical properties of the lenses, a shroud is preferable in most optical applications. It should be noted that, in alternative embodiments, other types of structural members could be substituted for the shroud to maintain the relative alignment of the lenses after being removed from the alignment jig 1000. For example, a structural member having openings therein could be used in an application in which the lenses will be contained inside a larger protective chamber. As used herein, the term "housing" is intended to refer to any rigid structural member (or multiple members) used to maintain the relative position of the lenses after being removed from an alignment jig and will remain part of the optical device after it is fully assembled.

Another embodiment of the alignment block is shown in FIGS. 16 and 17 and is generally referred to by reference numeral 500. In this embodiment, the alignment block 500 is comprised of two portions 501, 502, which form three slots 506, 507, 508 when joined. The slots 506, 507, 508 perform the same lens tab alignment function as the slot 406 of alignment block 400. The middle slot 507 is used with lenses having a third, downwardly-extending lens tab.

Each slot 506, 507, 508 includes a threaded opening 510, 511, 512 (respectively) which accommodates a set screw (not shown) that is used to hold a lens tab located in the slot against the portion 501 of the alignment block 500. Other types of devices, such as pins or spring-loaded plungers, could be used to hold the lens tabs in place. The middle slot 507 also includes a lateral opening 514, which is used to hold a lens tab located in the middle slot 507 against a side wall 515.

The two portions 501, 502 are bolted to each other using corresponding holes located in each of the two portions 501, 502 (e.g., holes 517, 516). The alignment block 500 is preferably attached to a base 2002 using holes located on the base 2002 and corresponding holes located in the portion 502 of the alignment block 500. A pin (not shown) is preferably inserted through the holes in the alignment block 500 and the base 2002, then secured in position by a screw or bolt. Each pin is preferably precision-machined to insure repeatable alignment between the alignment block 500 and the base 2002. The location of other alignment blocks on the base 2002 is determined by the location of the mounting holes in the base 2002 for each block.

The two-piece construction of the alignment block 500 reduces the complexity and cost of adjustments to the lens alignment in block 500 because such adjustments can be made by machining of only one portion 501. In addition, small adjustments may be made to the spacing between the two portions 501, 502 of the alignment block 500 by using shims (not shown). The use of shims allows for correction of any errors or inaccuracy in machining of the mating surfaces of the two portions 501, 502 of the alignment block 500.

While the principles of the invention have been described above in connection with preferred embodiments, it is to be clearly understood that this description is made only by way of example and not as a limitation of the scope of the invention.

The invention claimed is:

1. An optical device comprising:
   a lens train including a plurality of lenses, each of the plurality of lenses having a lens body and at least two lens tabs extending outwardly from the lens body;

a housing having a plurality of lens tab slots, each of the plurality of lens tab slots being configured so that the one of the plurality of lens tabs extends through the lens tab slot when the housing and plurality of lenses are fully assembled; and an adhesive positioned in at least some of the plurality of lens tab slots that prevents movement of each of the plurality of lenses relative to the housing.

2. The optical device of claim 1, wherein each of the plurality of lenses has at least one translational alignment tolerance and each of the plurality of lens tab slots is manufactured to a first dimensional tolerance, the first dimensional tolerance being larger than the at least one translational alignment tolerance.

3. The optical device of claim 1, wherein each of at least two lens tabs is manufactured to a first dimensional tolerance and each of the plurality of lens tab slots is manufactured to a second dimensional tolerance, the second dimensional tolerance being larger than the first dimensional tolerance.

4. The optical device of claim 1, wherein each of the plurality of lenses has a perimeter edge located between a front face and a rear face and each of the plurality of lens tabs is located along the perimeter edge.

5. An apparatus comprising:
a lens train including a plurality of lenses and a housing in which the plurality of lenses are contained in a fixed position, each of the plurality of lenses having a lens body and at least two lens tabs extending outwardly from the lens body, the shape and orientation of each of the at least two tabs on each of the plurality of lenses being different than the shape and/or orientation of each of the at least two tabs on each of the other lenses of the plurality of lenses.

6. The apparatus of claim 5, wherein each of the plurality of lenses has a perimeter edge and the at least two tabs of each of the plurality of lenses are unequally spaced around the perimeter edge.

7. The apparatus of claim 5, wherein the at least two tabs comprises three tabs.

8. A method for aligning a plurality of lenses in a lens train to form an optical device, the method comprising:
positioning each of the plurality of lenses on an alignment jig at a first tolerance that is no less than a predetermined alignment tolerance;
affixing each of the plurality of lenses to a housing at a second tolerance that is no less than the predetermined alignment tolerance, the housing being manufactured to a tolerance that is larger than the predetermined alignment tolerance;
removing the plurality of lenses and the housing from the alignment jig; and
maintaining the relative position of each of the plurality of lenses within a third tolerance that is no less than the predetermined alignment tolerance after the plurality of lenses and the housing are removed from the alignment jig.

9. The method of claim 8, further comprising placing an upper portion of the housing into the alignment jig after the positioning step.

10. The method of claim 8, wherein the affixing step further comprises using a gap filling adhesive to adhere each of the plurality of lenses to the housing.

11. The method of claim 8, wherein the alignment jig has a plurality of alignment blocks, each of the plurality of alignment blocks having a plurality of alignment slots located therein, and each of the plurality of lenses has at least two tabs, wherein the positioning step further comprises inserting each of the at least two tabs into a respective one of the plurality of alignment slots located in a respective one of the plurality of alignment blocks.

12. The method of claim 11, wherein the affixing step further comprises using a gap filling adhesive to fix the position of each of the at least two tabs in a corresponding slot formed in the housing to a tolerance that is no greater than the predetermined alignment tolerance.

13. The method of claim 11, wherein the positioning step further comprises urging a control surface located on each of the at least two tabs of each of the plurality of lenses against a bearing surface located in a respective one of the plurality of the alignment slots.

14. A method comprising:
positioning a first lens in a first alignment block;
affixing the first lens to a housing while the lens is positioned in the first alignment block; and
after the affixing step, removing the first lens from the first alignment block with the housing attached.

15. The method of claim 14, wherein the positioning step further comprises urging a control surface located on each of a plurality of tabs located on the first lens against a bearing surface located on the first alignment block.

16. The method of claim 14, wherein the positioning step further comprises positioning the first lens in the first alignment block within a first set of alignment tolerances, the first set of alignment tolerances including a tolerance for each of three degrees of translational freedom for the first lens.

17. The method of claim 16, further comprising maintaining the position of the first lens relative to the housing within the first set of alignment tolerances after the removing step.

18. The method of claim 17, wherein the affixing step comprises affixing the first lens to a housing while the first lens is positioned in the first alignment block, the housing being manufactured to a dimensional tolerance that is larger than any of the tolerances of the first set of alignment tolerances.

19. The method of claim 17, wherein the positioning step further comprises positioning a second lens in a second alignment block within a second set of alignment tolerances, the second set of alignment tolerances including a tolerance for each of three degrees of translational freedom for the second lens.

20. The method of claim 19, further comprising maintaining the position of the second lens relative to the housing within the second set of alignment tolerances after the removing step.

21. The optical device of claim 4, wherein the perimeter edge has a non-circular shape.

22. The optical device of claim 6, wherein the perimeter edge has a non-circular shape.

* * * * *